United States Patent
Farr et al.

(10) Patent No.: US 9,514,163 B2
(45) Date of Patent: Dec. 6, 2016

(54) DATABASE CONSOLIDATION TOOL

(75) Inventors: James A. Farr, Arlington, TX (US);
Billy Patrick Ledbetter, Spartanburg, SC (US); Timothy S. Morgan, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1705 days.

(21) Appl. No.: 11/282,444

(22) Filed: Nov. 17, 2005

(65) Prior Publication Data

US 2007/0112834 A1    May 17, 2007

(51) Int. Cl.
*G06F 17/30* (2006.01)

(52) U.S. Cl.
CPC ....... *G06F 17/303* (2013.01); *G06F 17/30466* (2013.01); *G06F 17/30498* (2013.01)

(58) Field of Classification Search
CPC .............. G06F 17/30498; G06F 17/30466; G06F 17/303
USPC ............ 707/7, 101, 803, 610, 714, 756
See application file for complete search history.

(56) References Cited

U.S. PATENT DOCUMENTS

| | | | | |
|---|---|---|---|---|
| 4,933,848 A | * | 6/1990 | Haderle et al. | 707/201 |
| 5,765,159 A | * | 6/1998 | Srinivasan | 707/102 |
| 6,516,326 B1 | | 2/2003 | Goodrich et al. | |
| 6,567,802 B1 | * | 5/2003 | Popa et al. | 707/3 |
| 6,615,220 B1 | * | 9/2003 | Austin et al. | |
| 6,714,935 B1 | * | 3/2004 | Delo | 707/803 |
| 6,748,392 B1 | * | 6/2004 | Galindo-Legaria et al. | 707/102 |
| 7,080,093 B2 | * | 7/2006 | Marejka et al. | |
| 7,350,191 B1 | * | 3/2008 | Kompella et al. | 717/108 |

FOREIGN PATENT DOCUMENTS

| | | |
|---|---|---|
| EP | 1093061 A1 | 4/2001 |
| WO | 03/073292 A1 | 9/2003 |

OTHER PUBLICATIONS

"An Analytical Model and an Optimal Scheduling Heuristic for Collective Resource Management" Qiang Sun, Sibel Systems, Inc.*
Rahm, E. and Do, H-H, "Data Cleaning Problems and Current Approaches", Quarterly Bulletin of the Computer Society of the IEEE Technical Committee on Data Engineering, The Committee, Washington, DC., Dec. 2000.
Ronstrom, Mikael, "On-line Schema Update for a Telecom Database", Data Engineering, 2000, Proceedings, 16th. International Conference on San Diego, CA, Feb. 29-Mar. 3, 2000, Los Alamitos, CA, pp. 329-338.

* cited by examiner

*Primary Examiner* — Vincent Boccio
(74) *Attorney, Agent, or Firm* — Gilbert Harmon, Jr.

(57) ABSTRACT

A method for consolidating a database in a Seibel CRM environment is presented. Bypassing the Business Object Layer (BOL) of the Seibel CRM environment, primary keys in a consolidated table are realigned such that a consolidated child table, created from two distinct databases, is able to point to reference items in a single parent table.

17 Claims, 17 Drawing Sheets

Read Parent Table User Key Control File to retrieve join column for Customer Type Table.

Parent Table User Key Control File ← 114

| Table | Column |
|---|---|
| Customer Type | Customer Type Name |

FIG. 1c

The target table and source temp table are joined together via the column identified from the Parent Table User Key Control File. This produces one logical record per Customer Type.

Customer Type Source Temp Table ← 112

| Customer Type Name | Row Id |
|---|---|
| Business Partner | 600 |
| Consumer | 601 |

Customer Type Table ← 104

| Row Id | Customer Type Name |
|---|---|
| 1 | Business Partner |
| 2 | Consumer |

Logical Customer Type Source/Target Result ← 116

| Customer Type Name | Source Row Id | Target Row Id |
|---|---|---|
| Business Partner | 600 | 1 |
| Consumer | 601 | 2 |

FIG. 1d

All of the child columns that require realignment are read from the FK Realignment Control File.

FIG. 1e

FK Realignment Control File — 118

| FK Table | Child Table | Child Column |
|---|---|---|
| Customer Type | Customer | Customer Type Id |

For the child column read from the FK Realignment Control file, all instances of the Source Row Id are replaced with the Target Row Id for all of the rows retrieved in the Logical Customer Type Source/Target Result.

Customer Table (Before) — 110

| Row Id | Customer Name | Customer Type Id |
|---|---|---|
| 100 | Alpha Corp. | 1 |
| 101 | Beta Corp | 2 |
| 200 | Company Y | 600 |
| 201 | Company Z | 601 |

Logical Customer Type Source/Target Result Table — 116

| Source Row Id | Customer Type Name | Target Row Id |
|---|---|---|
| 600 | Business Partner | 1 |
| 601 | Consumer | 2 |

Customer Table (After) — 120

| Row Id | Customer Name | Customer Type Id |
|---|---|---|
| 100 | Alpha Corp. | 1 |
| 101 | Beta Corp | 2 |
| 200 | Company Y | 1 |
| 201 | Company Z | 2 |

FIG. 1f

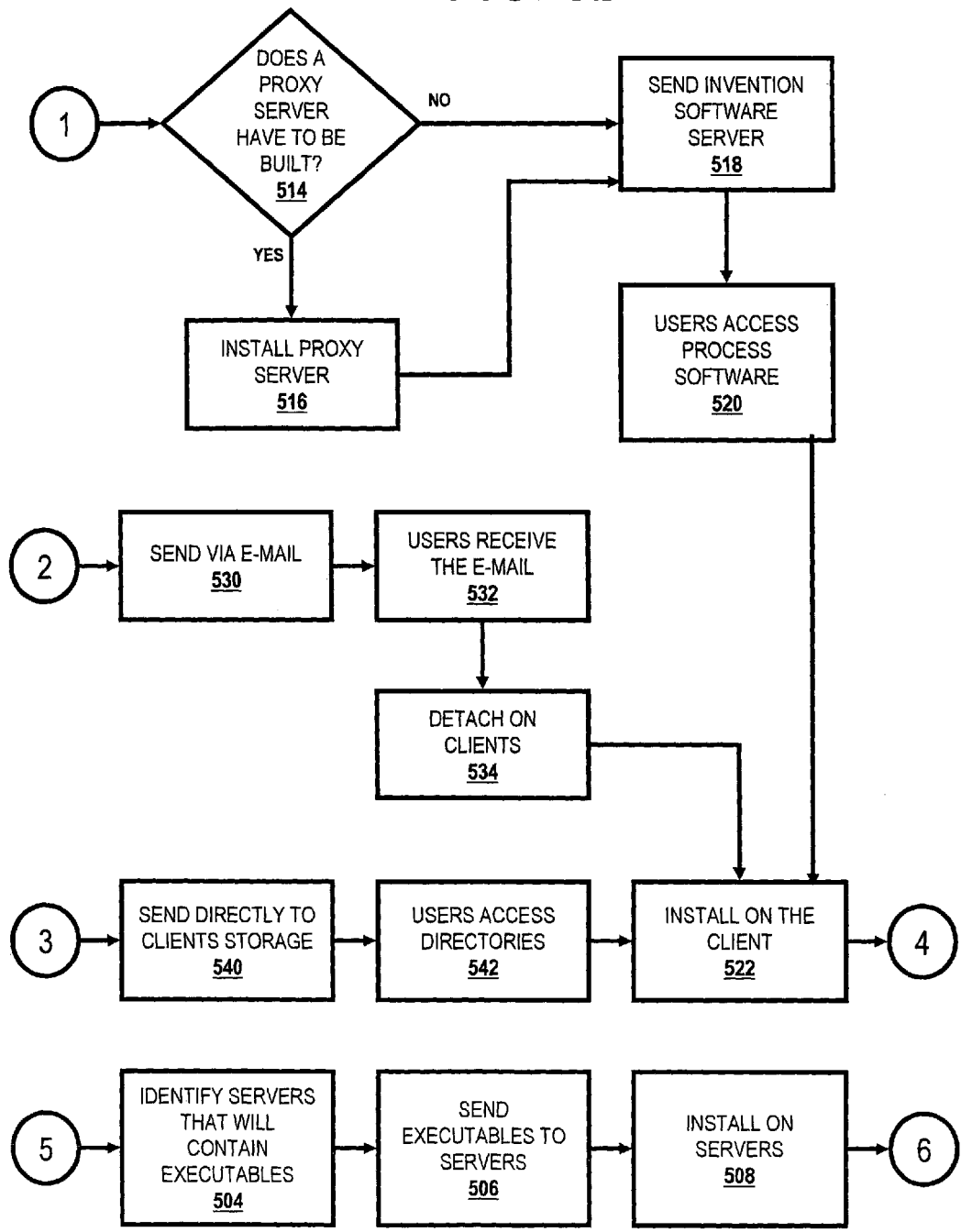

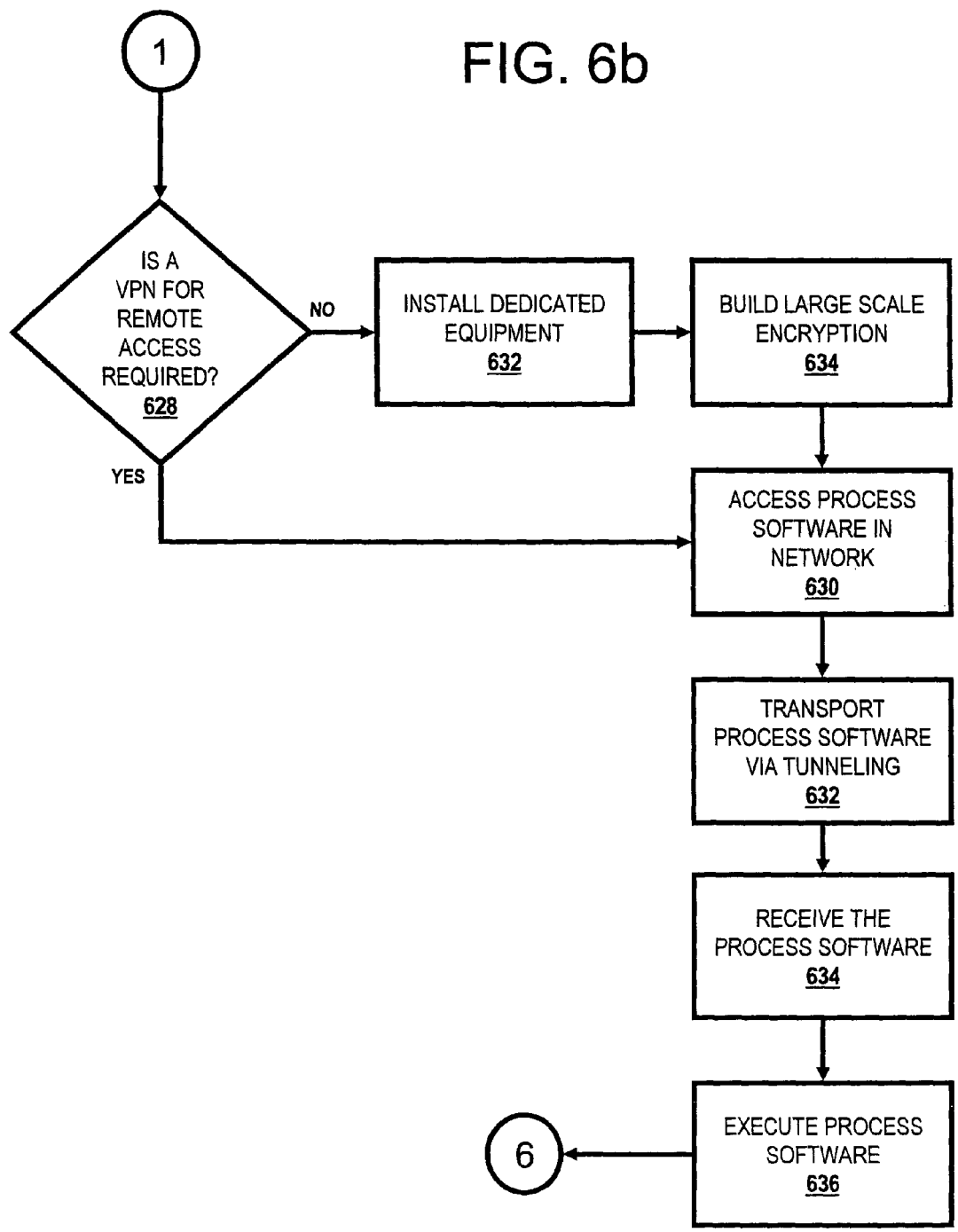

DATABASE CONSOLIDATION TOOL

BACKGROUND OF THE INVENTION

1. Technical Field

The present invention relates in general to the field of computers and similar technology systems, and in particular to software utilized by such systems to implement methods and processes. Still more particularly, the present invention relates to a computer-implementable method and system for consolidating databases through foreign key realignment.

2. Description of the Related Art

Siebel Systems® provides a Customer Relationship Management (CRM) system ("Siebel CRM"). Siebel CRM is a useful software package for tracking and managing product orders, shipping, sales opportunities, etc. Under a Graphical User Interface (GUI) presentation layer of the software in Siebel CRM is a Business Object Layer (BOL). This provides business logic that describes relationships between and among databases in the CRM system. Under the BOL is a Data Object Layer (DOL), which includes the databases and database tables without any intelligence (logic). Under the Siebel CRM protocol, any consolidation of two or more databases in the DOL require coordination though the BOL, using Seibel's eBusiness Application Integration (EAI) or Enterprise Integration Manager (EIM). However, both tools require extensive custom configuration to ensure data mappings are in place for all data elements included in the migration. Furthermore, EIM (which is preferred by Seibel for large-scale data migration tasks) requires supporting applications for extract/load automation and exception handling to support a complete end-to-end solution.

SUMMARY OF THE INVENTION

Recognizing the need for a method of consolidating databases, the present invention presents a method, system and computer-implementable medium for: associating a child target table with a parent target table, wherein each row in the child target table includes a first foreign key pointer to a target primary key in the parent target table; associating a child source table with a parent source table, wherein each row in the child source table includes a second foreign key pointer to a source primary key in the parent source table; merging the child target table with the child source table to form a consolidated child table; creating a temporary parent source table that is a copy of the parent source table; reading, from a foreign key table control file, a script that associates the target primary key and the source primary key with a single reference item found in both the parent target table and the parent source table to produce, in an interim source/target reference table, one logical record per each reference item; reading, from a foreign key realignment control file, a script to determine which child columns in the consolidated child table require realignment such that each same reference item has a same primary key; creating a realigned consolidated child table based on the foreign key realignment control file; and pointing each entry in the realigned consolidated child table to the parent target table. In a preferred embodiment, the method is performed using Siebel® CRM databases, such that a Business Object Layer (BOL) in the Siebel CRM environment is bypassed.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 1a-g show progressive changes to target and source databases to realign foreign key pointers;

FIGS. 5a-b show a flow-chart of steps taken to deploy software capable of executing the steps shown and described in FIGS. 1-2;

FIGS. 6a-c show a flow-chart of steps taken to deploy in a Virtual Private Network (VPN) software that is capable of executing the steps shown and described in FIGS. 1-2;

DETAILED DESCRIPTION OF THE PREFERRED EMBODIMENT

This invention presents a method and system for consolidating databases. Common reference and admin associations are remapped in the source database to the matching reference or admin item in the target database. This operation is referred to as Foreign Key Realignment. Prior to invoking Foreign Key Realignment, reference/admin (parent) tables from the target database are migrated to the source database. This data is stored in temporary tables and is used by the Foreign Key Realignment application to perform lookups of matching reference/admin data between the two databases, such that foreign key pointers in the source customer data to source reference/admin data can be realigned to point to the corresponding target reference/admin items.

Upon completion of the Foreign Key Realignment, a migration tool is utilized to migrate customer data from the source database to the target database. This tool takes as input a list of tables that are required for migration.

Foreign Key Realignment/Migration can be accomplished in a matter of hours as opposed to days/weeks using standard Siebel tools. Additionally, because Foreign Key Realignment and Migration each use a common engine, the community of Foreign Key pointers to align and tables to migrate can be set in control files, and thus do not have to be individually configured, as required with EIM and EAI.

With reference now to the figures, and in particular to FIGS. 1a-g, a set of figures showing how databases are manipulated/consolidated in an exemplary manner by the present invention is presented. Starting with FIG. 1a, a child target table 102 ("Customer Table") includes a column of primary keys ("Row Id"), a child name column ("Customer Name") of entry names, and a column of foreign keys ("Customer Type Id"). Each foreign key points to a primary key (found in "Row Id") in a parent target table 104 ("Customer Type Table"), which also includes a value for a reference item ("Customer Type Name"). Thus, "Alpha Corp." is pointed by foreign key "1" to primary key "1" to identify "Alpha Corp." as a "Business Partner."

A similar relationship exists between child source table 106 ("Customer Table") and parent source table 108 ("Customer Type Table"). In the conventional Seibel CRM environment, target database 101 (child target table 102 and parent target table 104) and source database 105 (child source table 106 and parent source table 108) are independent. That is, child target table 102 does not point to parent source table 108, and child source table 106 does not point to parent target table 104.

Figure 1A:
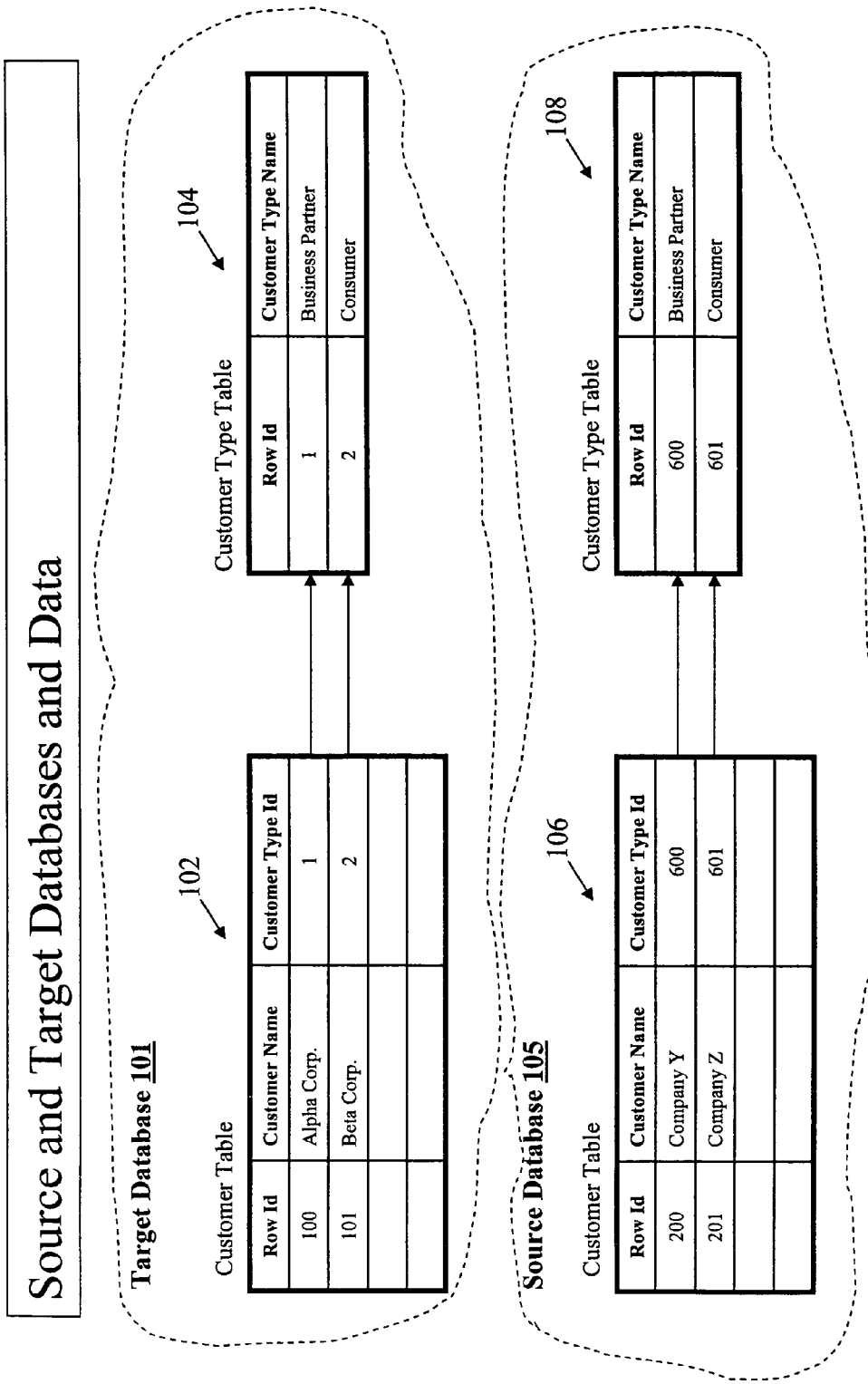
Figure 1B:
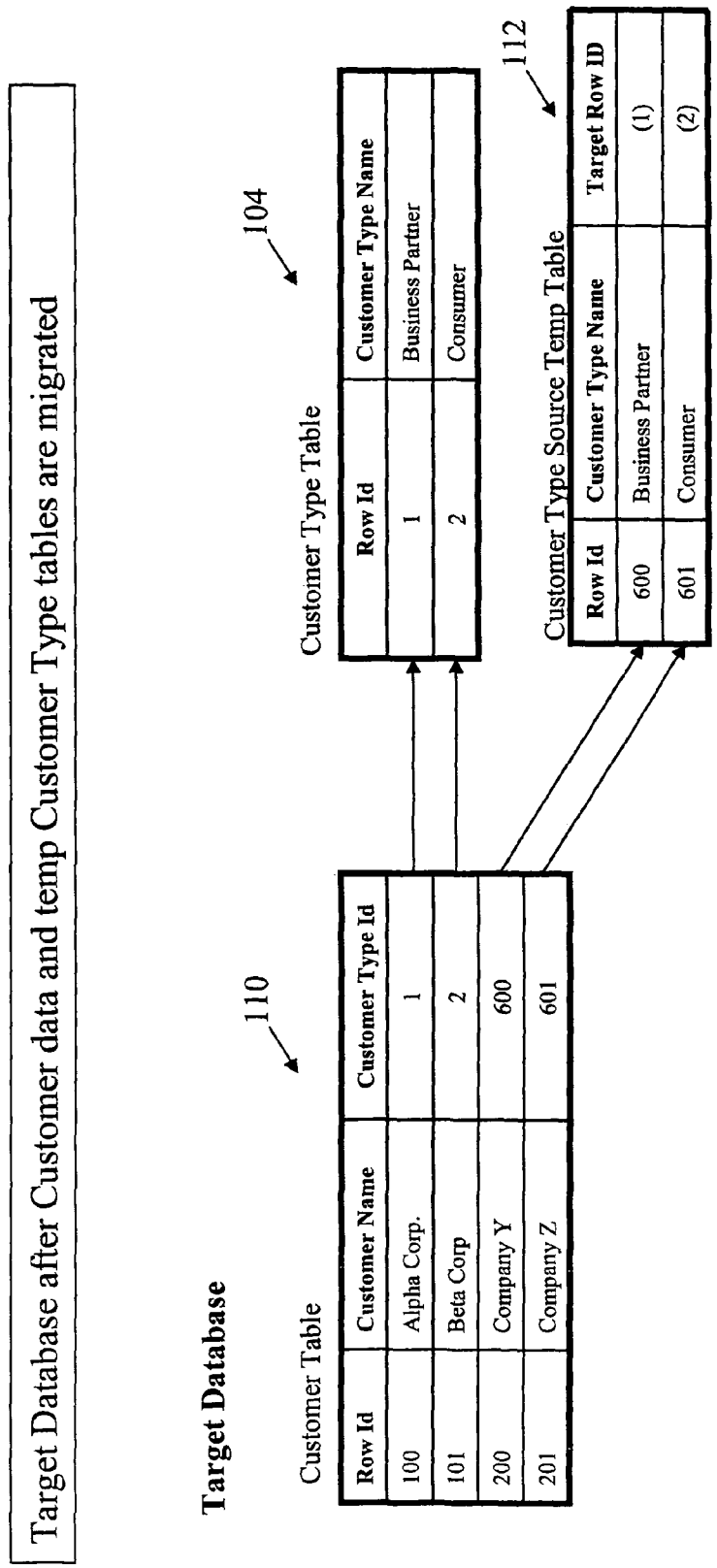

Referring then to FIG. 1b, a new temporary parent source table 112 is created in the target database. Temporary parent source table 112 is a copy of parent source table 108 from the source database, with the addition of a column entitled "Target Row ID," which will be used to track completion states of Foreign Key Realignment (FKR) as described below. Note also in FIG. 1b that child target table 102 and child source table 106 from FIG. 1a have been merged to form a consolidated child table 110 ("Customer Table"). Since all tables shown in FIG. 1b are in a same Seibel CRM database, then consolidated child table 110 is able to point to both parent target table 104 as well as temporary parent source table 112. However, this presents the problem of reference items such as "Business Partner" having disparate primary keys, "1" and "600," respectively in parent target table 104 and temporary parent source table 112.

Therefore, as shown in FIG. 1c, a row from a Parent Table User Key Control File 114 is read. This script knows which tables match up, and coordinates a target table name "Table" with a target "Column." The target table and source temp table are joined together via the column identified from the Parent Table User Key Control File 114 to create an interim logical source/target reference table 116, shown in FIG. 1d. Table 116 identifies which primary keys were used to identify reference items in the tables shown in FIG. 1a.

Figure 1G:
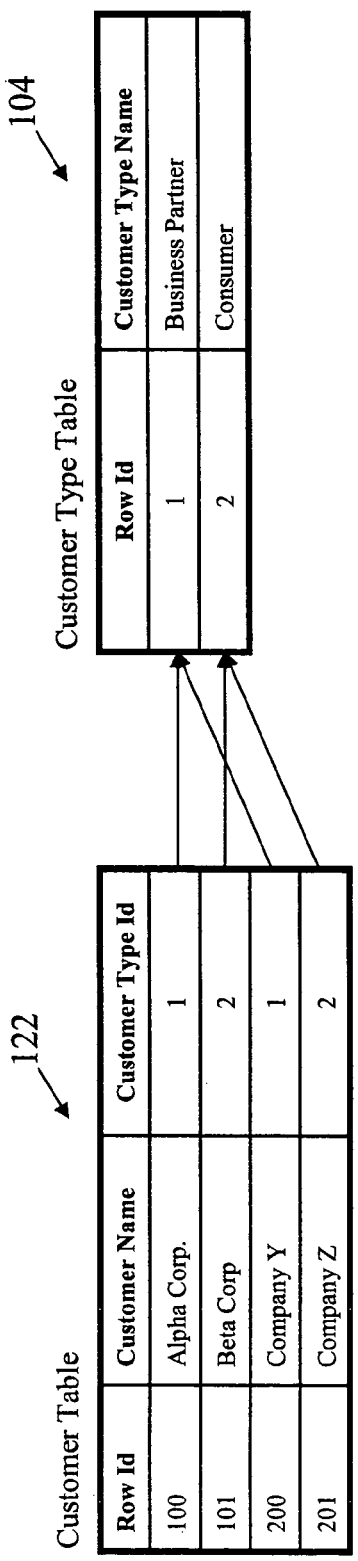

With reference now to FIG. 1e, all of the defined child columns that require realignment are read from FK Realignment Control File 118. For the child column read from RK Realignment Control File 118, all instances of the Source Row Id are replaced with the Target Row Id for all of the rows retrieved in the Logical Customer Type Source/Target Result. Thus, as shown in FIG. 1f, a Logical Customer Type Source/Target Result Table 116 is consulted to create a realigned consolidated child table 120 ("Customer Table (After)"). As seen in FIG. 1g, realigned consolidated child table 120 is then used for pointing each entry therein to the original parent target table 104.

Figure 2:
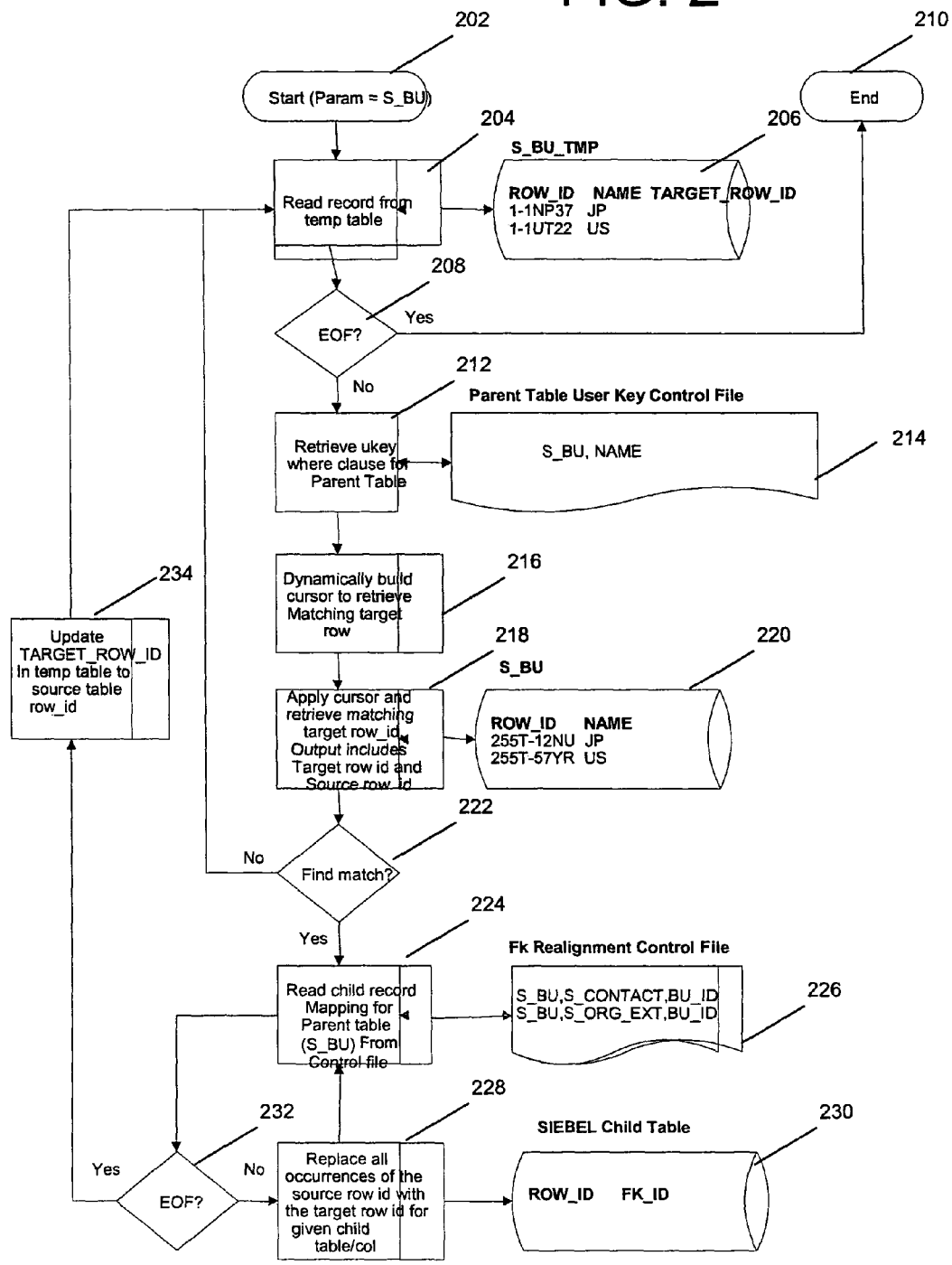
FIG. 2 is a flow-chart showing the steps illustrated in FIGS. 1a-g using Siebel® Customer Relationship Management (CRM®) databases.

FIG. 2 presents the present invention with specificity to the Seibel CRM environment. Starting at initiator block 202, a script is invoked for the parent target table that is to ultimately have it's related child tables realigned (S_BU). As shown at block 204, a record is read from the source temporary table (such as table 112 shown in FIG. 1b), as described in field 206. If an end of file is reached (query block 208), then the process ends (terminator block 210). Otherwise, the user key(s) for the S_BU table is retrieved (block 212) for the parent table of the children to be realigned, as described in document 214.

A cursor is dynamically built to retrieve a matching target parent row (block 216), similarly to the process shown with table 116 in FIG. 1d. The cursor is applied to retrieve a matching target row_id (block 218). The output includes target row id and source rowid, and the database 220 is consulted. If a match is found (query block 222), then the first mapped child table and column for the parent table (S_BU) is read from the control file (block 224) (analogous to the FK Realignment Control File 118 shown in FIG. 1e), as shown from document 226. If this is not the end of the file (query block 232), then all occurrences of the source row id are replaced with the target rowid for a given child table/column (block 228), through reference to database table 230 (see analogous description for table 120 in FIG. 1f). This replacement is preferably performed using a Structured Query Language (SQL). Thus, the step of creating a realigned consolidated child table utilizes a Structured Query Language (SQL) to populate the consolidated child table.

As describe in block 234, the TARGET_ROW_ID is updated to the source row id in the temporary table (shown in FIG. 1b as table 112).

As illustrated in FIG. 2 in the Siebel CRM environment, realigning all foreign key pointers for one reference/admin table (S_BU) is dictated by the reference control files. The Foreign Key Realignment script is invoked one parent table at a time, and takes as an argument the name of the particular table.

Thus, the method depicted in FIG. 2 includes two main steps: 1) importing parent tables from target database to source database, and 2) invoking Foreign Key Realignment.

Import Reference/Admin Data from Target Database to Source Database

Selected columns for Foreign Key Realignment (FKR) required parent data are extracted from the target database and loaded into the source database. Columns include a parent identifier column, which contains the pointer referenced in the child tables, along with the required user keys utilized in the lookup. In addition, a custom extension column called TARGET_ROW_ID is included for each parent table.

Three scripts are used to accomplish this import parent tables task. There is a build script to build the temp tables, an extract script to retrieve the target database tables, and a load script to load data from delimited files into the temp tables in the source database.

Invoke Foreign Key Realignment (FKR)

FKR utilizes two control files, as well as a ksh (script) file to invoke FKR for specific parent tables. The first control file (FK Realignment Control File) contains a list of parent tables and associated child tables and columns which contain foreign key pointers to the particular parent table. The second control file (Parent Table User Key Control File) contains the user key definitions for the parent tables.

Figure 3:
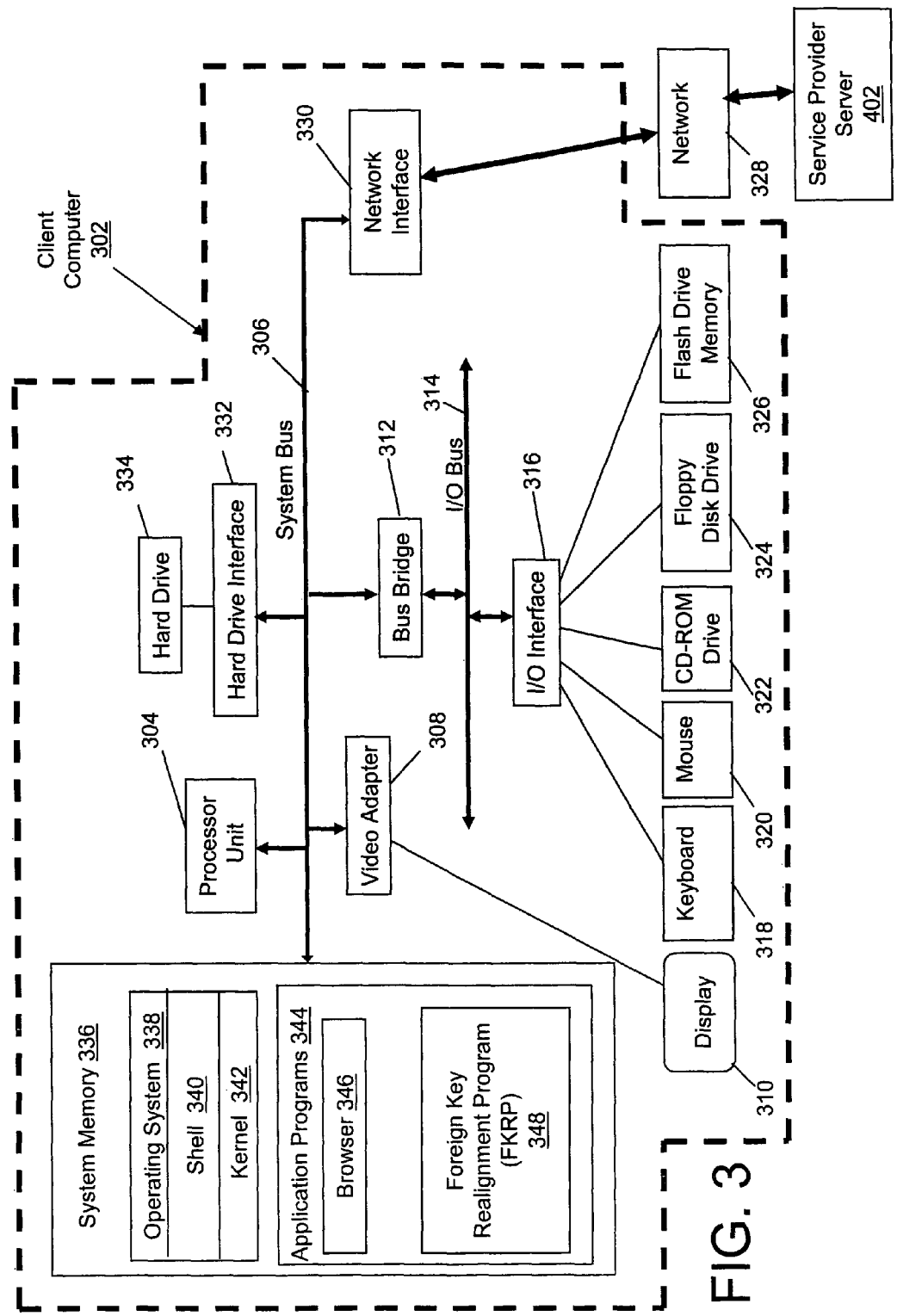
FIG. 3 illustrates an exemplary computer in which the present invention may implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a Foreign Key Realignment Program (FKRP) 348. FKRP 348 includes code for implementing the processes described in FIGS. 1-2. In one embodiment, client computer 302 is able to download FKRP 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
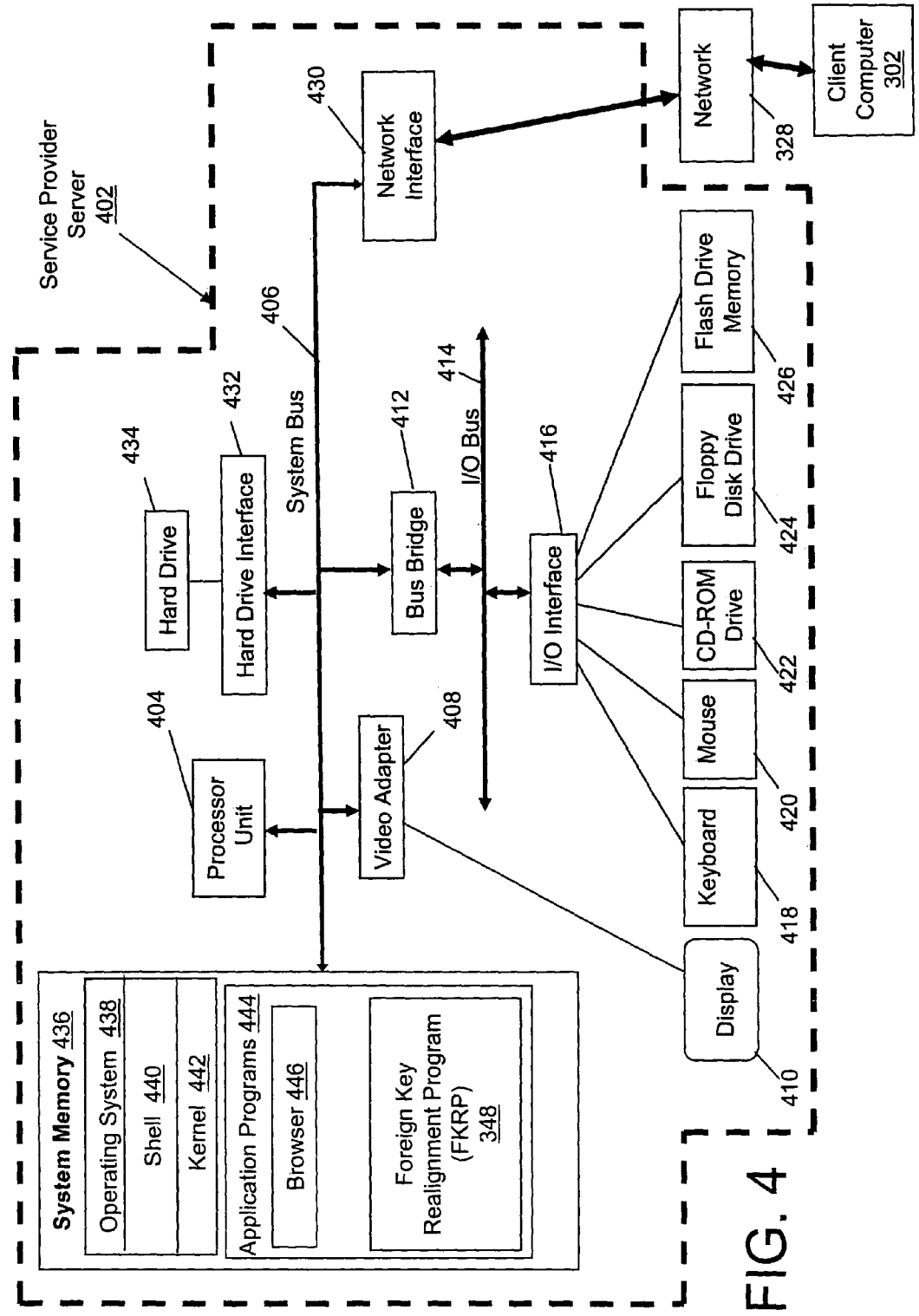
FIG. 4 depicts an exemplary server from which software for executing the present invention may be deployed.

As noted above, FKRP 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to deploy FKRP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of FKRP 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of FKRP 348), thus freeing client computer 302 from having to use its own internal computing resources to execute FKRP 348.

It should be understood that at least some aspects of the present invention may be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of FKRP 348, is performed by service provider server 402. Alternatively, FKRP 348 and the method described herein, and in particular as shown and described in FIGS. 1-2, can be deployed as a process software from service provider server 402 to client computer 302. Still more particularly, process software for the method so described may be deployed to service provider server 402 by another service provider server (not shown).

Figure 5A:
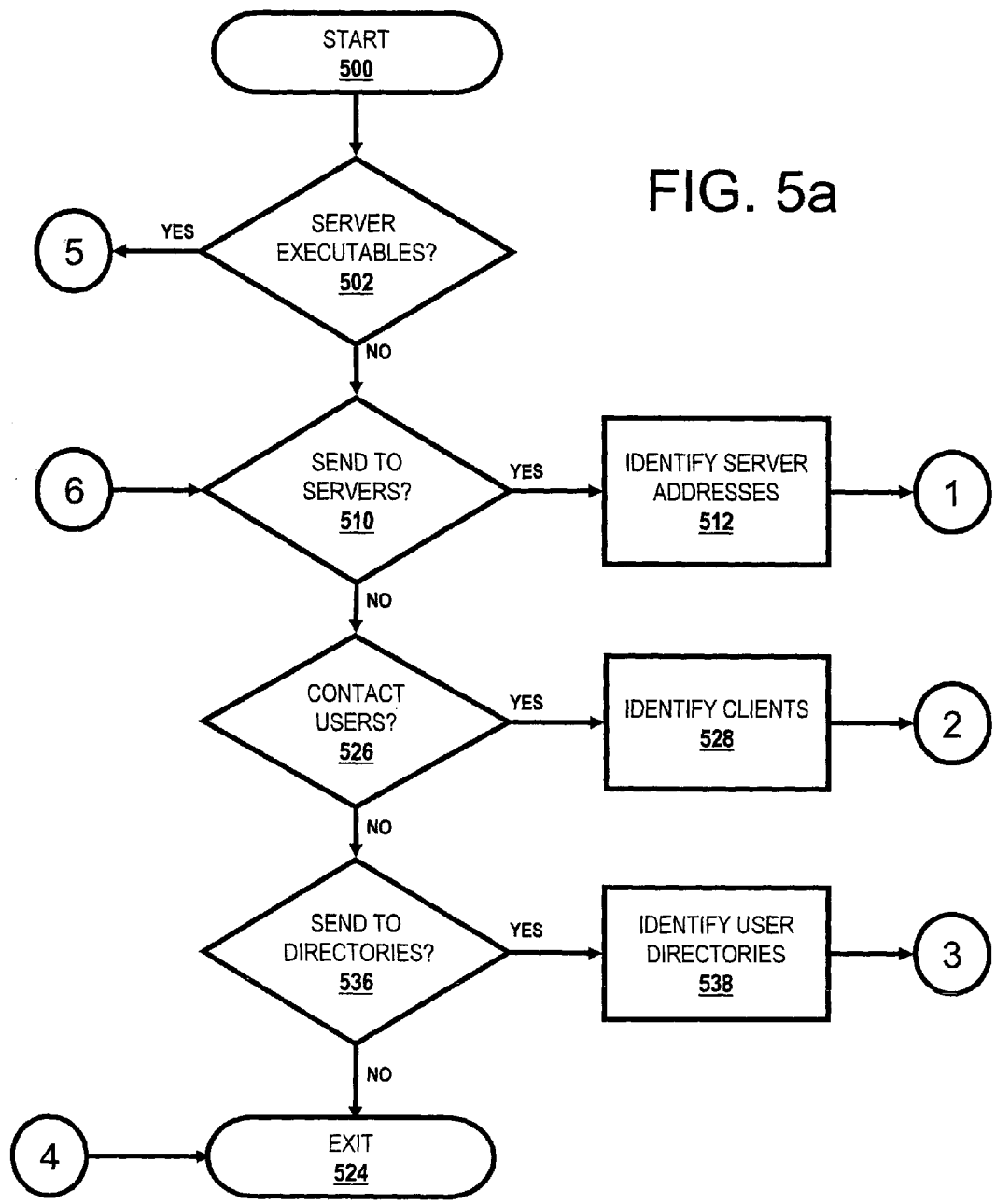

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 6A:
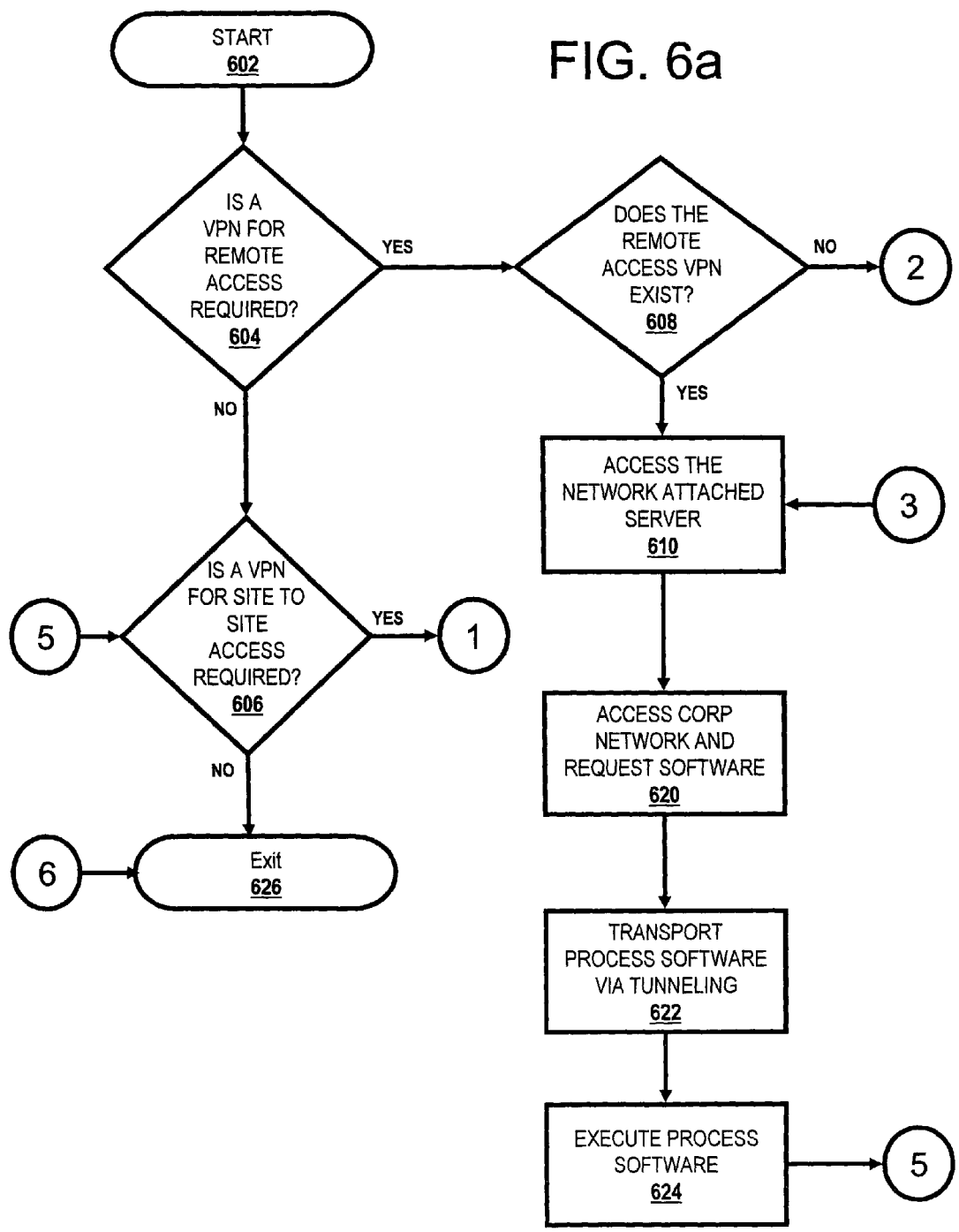
Figure 6C:
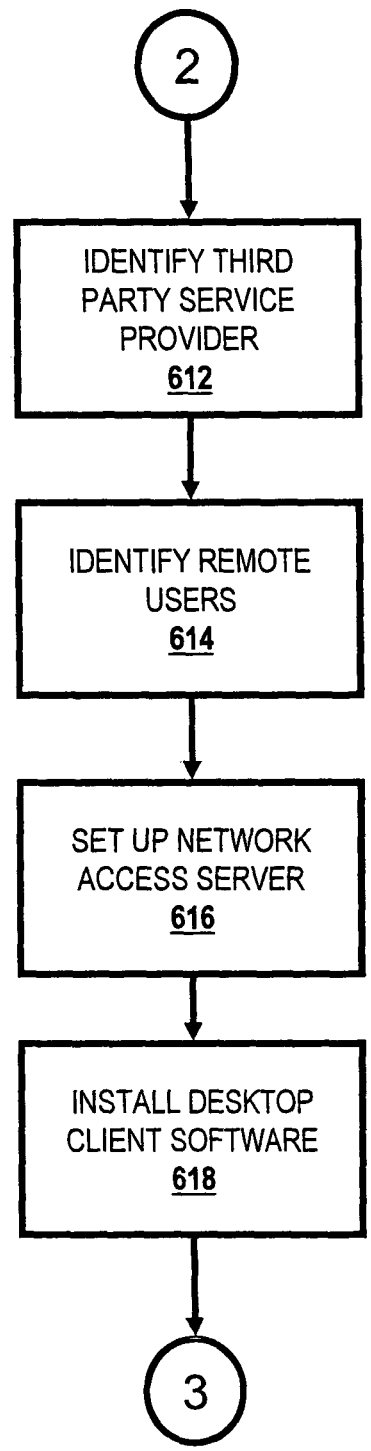

The process for such VPN deployment is described in FIG. 6. Initiator block 602 begins the Virtual Private Network (VPN) process. A determination is made to see if a VPN for remote access is required (query block 604). If it is not required, then proceed to (query block 606). If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is the process software is divided into packets and each packet including the data and protocol is placed within another packet (block 622). When the process software arrives at the remote user's desk-top, it is removed from the packets, reconstituted and then is executed on the remote users desk-top (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 632). Then build the large scale encryption into the VPN (block 634).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site users desk-top (block 636). The process then ends at terminator block 626.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
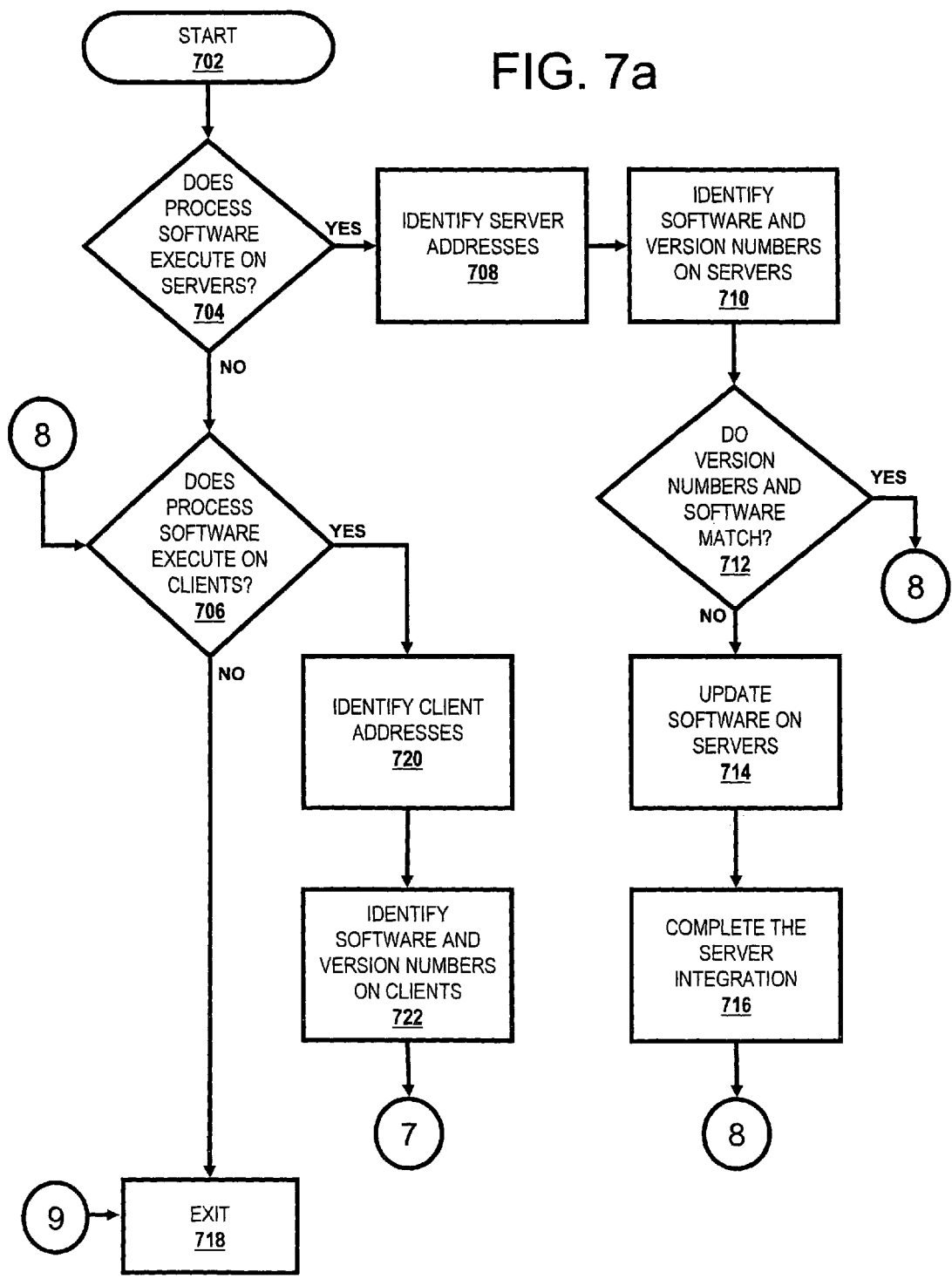
FIGS. 7a-b show a flow-chart showing steps taken to integrate into an computer system software that is capable of executing the steps shown and described in FIGS. 1-2.
Figure 7B:
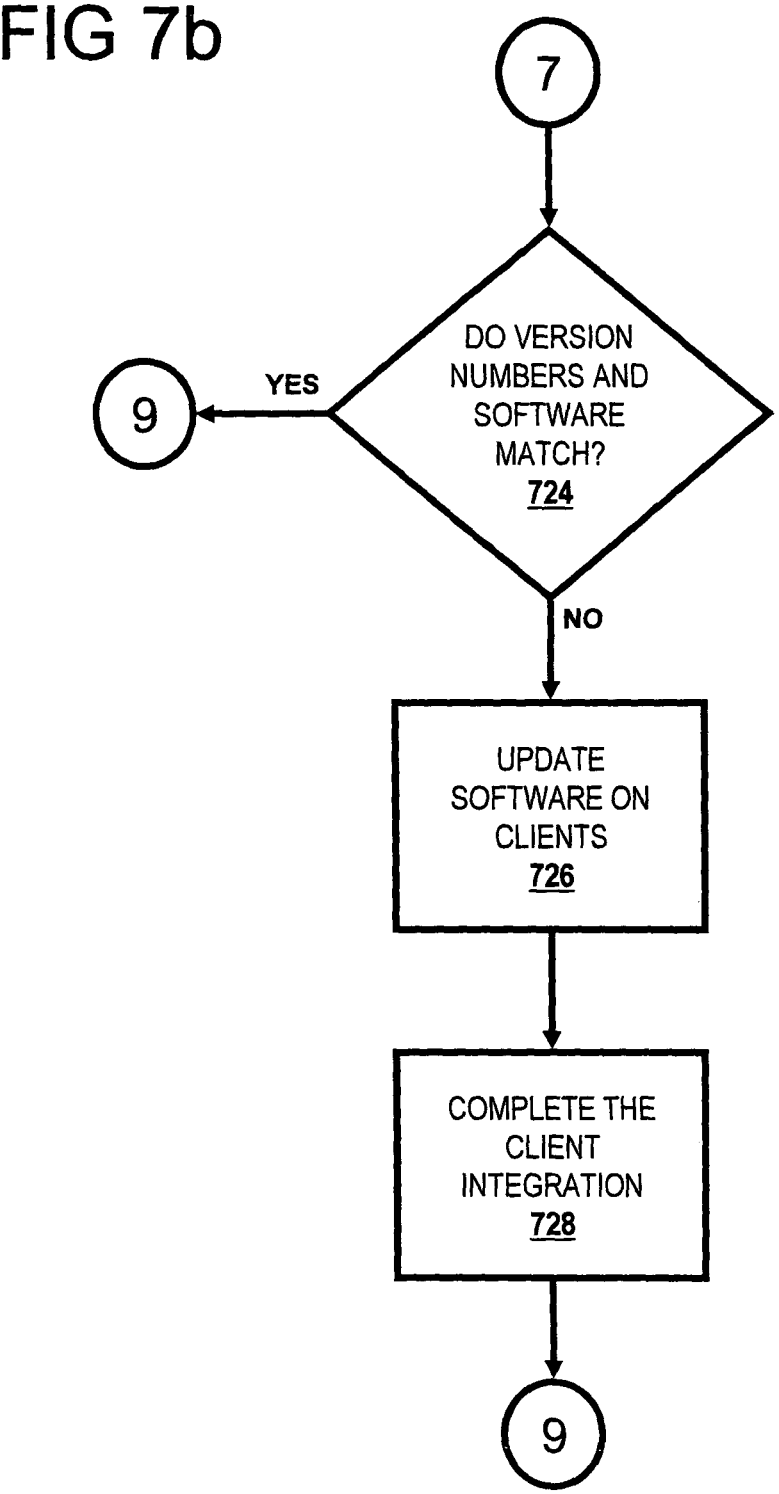

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
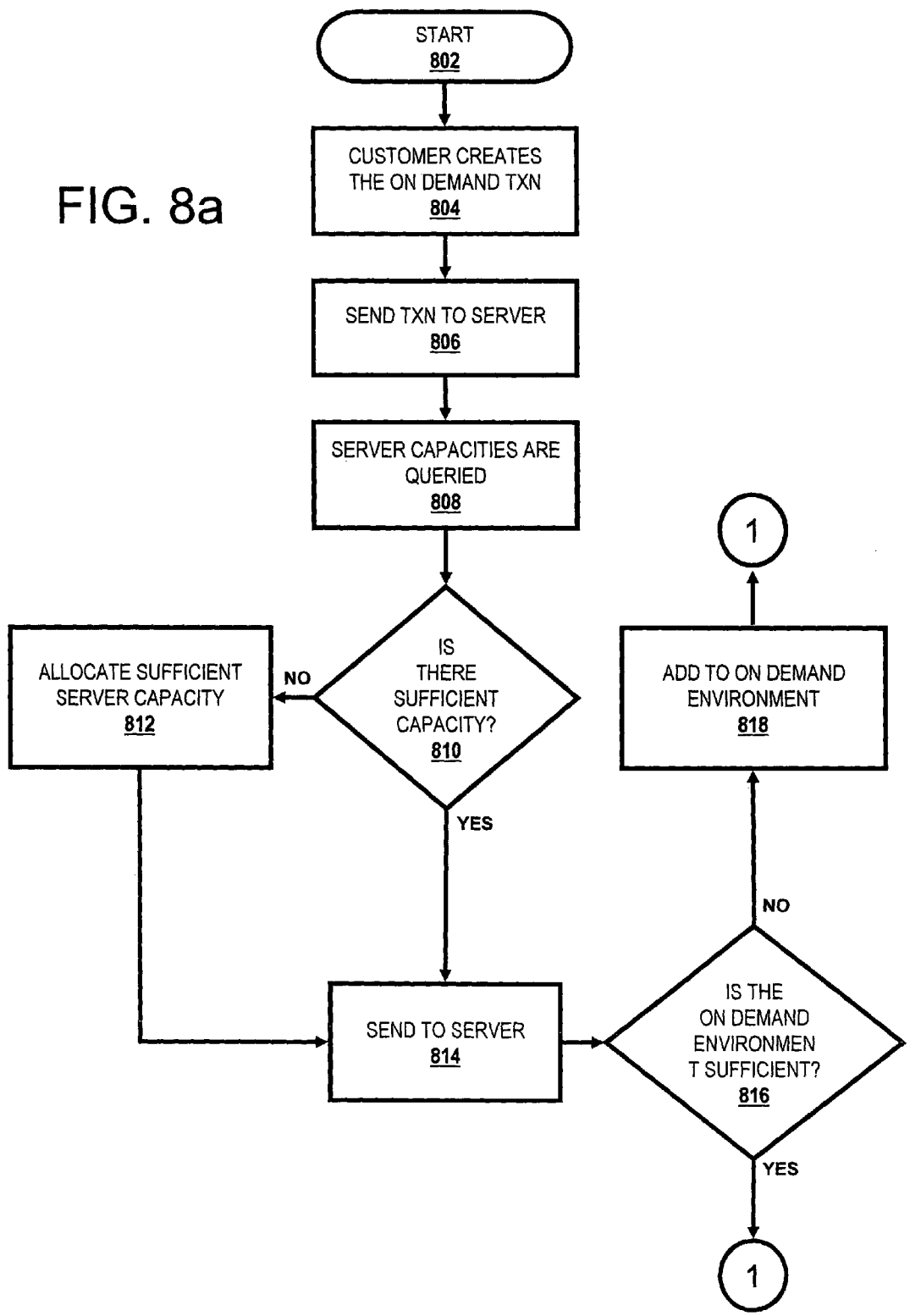
FIGS. 8a-b show a flow-chart showing steps taken to execute the steps shown and described in FIGS. 1-2 using an on-demand service provider.
Figure 8B:
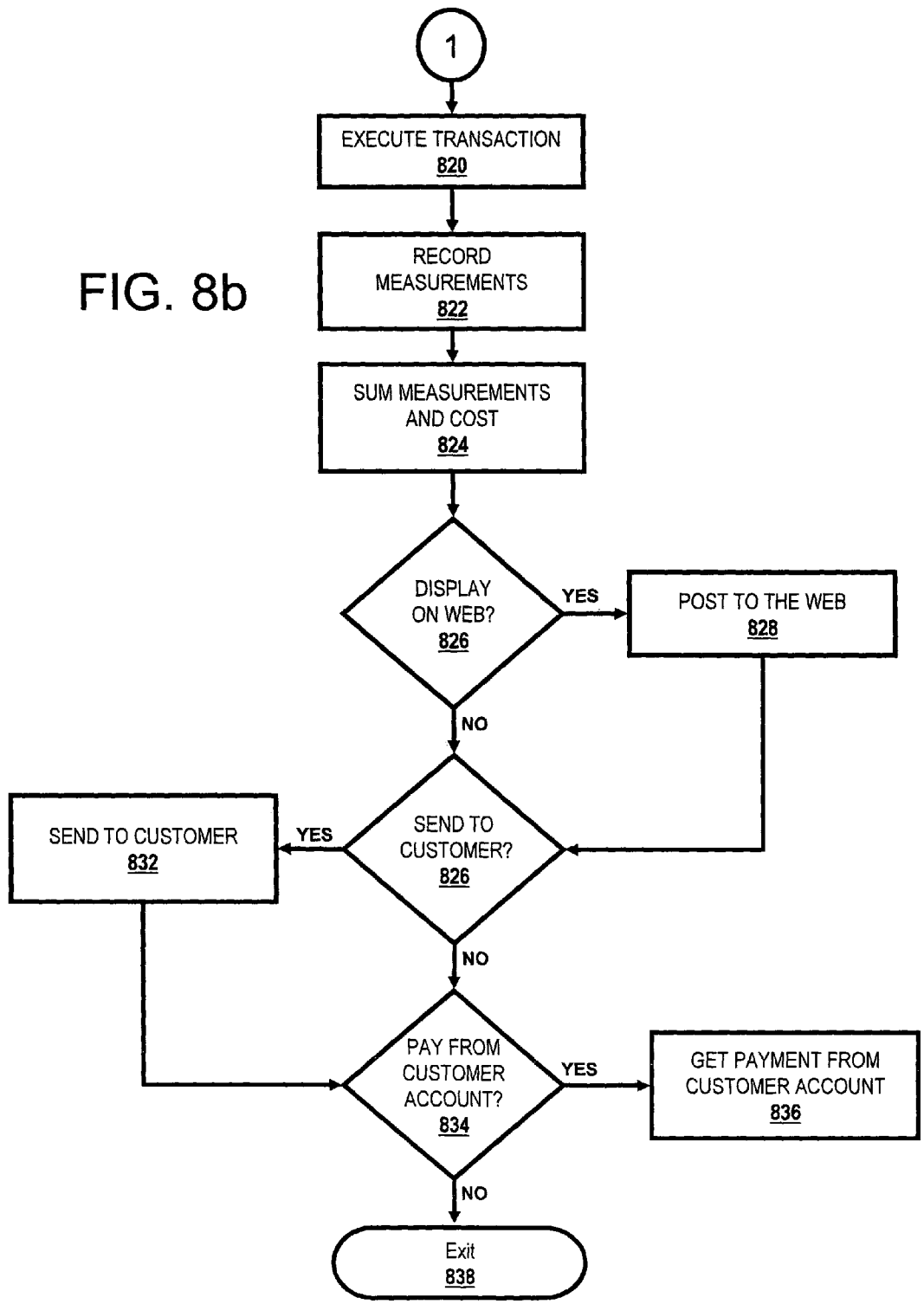

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient Available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

The present invention thus provides, in one preferred embodiment, a method, system and computer useable medium for bypassing the BOL in the Siebel CRM system. This provides a significant improvement over the prior art by speeding up the process of updating databases as described above.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for consolidating a plurality of databases, the method comprising:

associating a child target table with a parent target table, wherein each row in the child target table includes a first foreign key pointer to a target primary key in the parent target table, wherein the parent target table provides a first administrative descriptor of each data field in the child target table;

associating a child source table with a parent source table, wherein each row in the child source table includes a second foreign key pointer to a source primary key in the parent source table, wherein the parent source table provides a second administrative descriptor of each data field in the child source table;

merging the child target table with the child source table to form a consolidated child table;

creating a temporary parent source table by copying the parent source table and adding a target row ID column used to track completion states of Foreign Key Realignment (FKR);

reading, from a foreign key table control file, a script that associates the target primary key and the source primary key with a single reference item found in both the parent target table and the temporary parent source table to produce, in an interim source/target reference table, one logical record per each reference item;

reading, from a foreign key realignment control file, a script to determine which child columns in the consolidated child table require realignment such that each same reference item has a same primary key;

reading each defined child column that requires alignment from the foreign key realignment control file;

creating a realigned consolidated child table and a common set of reference data, based on replacing each instance of the second foreign key pointer with the first foreign key pointer, in the consolidated child table, for all rows retrieved from the interim source/target reference table, wherein the first foreign key pointer is selected based on matching the first administrative descriptor with the second administrative descriptor; and pointing each entry in the realigned consolidated child table to the parent target table.

2. The method of claim 1, wherein the database is a Siebel CRM database system that includes a business object layer (BOL) and wherein further the method avoids using the BOL.

3. The method of claim 1, wherein the step of creating a realigned consolidated child table utilizes a Structured Query Language (SQL) to populate the consolidated child table.

4. The method of clam 1, further comprising:
migrating reference (parent) tables from the target database to the source database prior to invoking Foreign Key Realignment;
storing the migrated data in temporary tables for later use by the Foreign Key Realignment application to perform lookups of matching reference data between the two databases, wherein foreign key pointers in a source customer data to source reference data can be realigned to point to corresponding target reference/admin items; and
in response to completion of the Foreign Key Realignment, migrating customer data from the source database to the target database utilizing a migration tool which takes an input comprising a list of tables that are required for migration;
wherein Foreign Key Realignment and migration each use a common engine, and a community of Foreign Key pointers to align and tables to migrate can be set in control files, and do not have to be individually configured.

5. The method of claim 1, further comprising:
creating a new temporary parent source table in the target database, wherein the temporary parent source table is a copy of the parent source table from the source database, with an addition of a target row ID column used to track completion states of Foreign Key Realignment (FKR); and
merging the child target table and child source table to form a consolidated child table, which points to both parent target table as well as temporary parent source table.

6. The method of claim 1, further comprising:
reading a row from a Parent Table User Key Control File, which includes information that identifies which tables match up and coordinates a target table name with a target column; and
joining the target table and source temp table together via the column identified from the Parent Table User Key Control File to create an interim logical source/target reference table, which identifies which primary keys were used to identify reference items in the tables.

7. The method of claim 1, further comprising: creating the realigned consolidated child table by consulting with an interim Source/Target reference Table.

8. The method of claim 1, further comprising:
invoking a script for the parent target table that is to ultimately have a related child table realigned (S_BU);
reading a record from the source temporary table; and
retrieving one or more user key(s) for the S_BU table for the parent table of the children to be realigned.

9. The method of claim 1, further comprising:
dynamically building a cursor to retrieve a matching target parent row;
applying the cursor to retrieve a matching target row ID, wherein an output includes the target row ID and source row ID;
consulting the database to find a match;
in response to finding a match:
reading the first mapped child table and column for the parent table (S_BU) from the control file;
replacing all occurrences of the source row id with the target row id for a given child table/column, through reference to a database table; and
updating the target row ID to the source row ID in the temporary table.

10. The method of claim 1, further comprising:
importing reference/admin data from target database to source database by:
extracting selected columns for Foreign Key Realignment (FKR) required parent data from the target database;
loading the selected columns into the source database, wherein each selected column includes a parent identifier column, which contains a pointer referenced in the child tables, along with required user keys utilized in the lookup; and
adding a custom extension column for each parent table; and
updating a target row ID to a source row ID in the temporary table.

11. The method of claim 1, wherein:
said creating a realigned consolidated child table utilizes a Structured Query Language (SQL) to populate the consolidated child table;
the importing of parent tables is completed via a build script to build the temp tables, an extract script to retrieve the target database tables, and a load script to load data from delimited files into the temp tables in the source database; and
invoking Foreign Key Realignment (FKR) for specific parent tables is completed via two control files, as well as a ksh (script) file, where a first control file contains a list of parent tables and associated child tables and columns which contain foreign key pointers to the particular parent table and a second control file contains user key definitions for the parent tables.

12. A system comprising:
a hardware processor;
a data bus coupled to the hardware processor;
a memory coupled to the data bus; and
a computer readable storage medium embodying computer program code, the computer program code comprising instructions executable by the hardware processor and configured to:
associate a child target table with a parent target table, wherein each row in the child target table includes a first foreign key pointer to a target primary key in the parent target table;
associate a child source table with a parent source table, wherein each row in the child source table includes a second foreign key pointer to a source primary key in the parent source table;
merge the child target table with the child source table to form a consolidated child table;

create a temporary parent source table by copying of the parent source table and adding a target row ID column used to track completion states of Foreign Key Realignment (FKR);

read, from a foreign key table control file, a script that associates the target primary key and the source primary key with a single reference item found in both the parent target table and the temporary parent source table to produce, in an interim source/target reference table, one logical record per each reference item;

read, from a foreign key realignment control file, a script to determine which child columns in the consolidated child table require realignment such that each same reference item has a same primary key;

read each defined child column that requires alignment from the foreign key realignment control file;

create a realigned consolidated child table and a common set of reference data, based on replacing each instance of the second foreign key pointer with the first foreign key pointer, in the consolidated child table, for all rows retrieved from the interim source/target reference table, wherein the first foreign key pointer is selected based on matching the first administrative descriptor with the second administrative descriptor; and point each entry in the realigned consolidated child table to the parent target table.

13. The system of claim 12, wherein the database is a Siebel CRM system having a business object layer (BOL) and wherein further the method avoids using a BOL in the Siebel CRM system.

14. A non-transitory computer readable storage medium embodying computer program code, the computer program code comprising computer executable instructions configured to cause a data processing system to:

associate a child target table with a parent target table, wherein each row in the child target table includes a first foreign key pointer to a target primary key in the parent target table;

associate a child source table with a parent source table, wherein each row in the child source table includes a second foreign key pointer to a source primary key in the parent source table;

merge the child target table with the child source table to form a consolidated child table;

create a temporary parent source table by copying the parent source table and adding a target row ID column used to track completion states of Foreign Key Realignment (FKR);

read, from a foreign key table control file, a script that associates the target primary key and the source primary key with a single reference item found in both the parent target table and the parent source table to produce, in an interim source/target reference table, one logical record per each reference item;

read, from a foreign key realignment control file, a script to determine which child columns in the consolidated child table require realignment such that each same reference item has a same primary key;

read each defined child column that requires alignment from the foreign key realignment control file;

create a realigned consolidated child table and a common set of reference data, based on replacing each instance of the second foreign key pointer with the first foreign key pointer, in the consolidated child table, for all rows retrieved from the interim source/target reference table, wherein the first foreign key pointer is selected based on matching the first administrative descriptor with the second administrative descriptor; and point each entry in the realigned consolidated child table to the parent target table.

15. The non-transitory computer readable storage medium of claim 14, wherein the database is a Siebel CRM system having a business object layer (BOL) and wherein further the computer executable instructions perform database consolidation while avoiding use of the Business Object Layer (BOL) in the Siebel CRM system.

16. The non-transitory computer readable storage medium of claim 14, wherein the computer program code is deployed to a client computer from a server at a remote location.

17. The non-transitory computer readable storage medium of claim 14, wherein the computer program code is provided by a service provider to a customer on an on-demand basis, wherein the on-demand basis is determined by evaluating a Central Processing Unit (CPU) capacity of the client computer, and wherein if sufficient CPU capacity at the client computer is not available to receive the computer program code, allocating additional CPU capacity from another CPU in the client computer to receive and process the computer program code.

* * * * *